UNITED STATES PATENT OFFICE.

JOHN B. SLIMM, OF BUFFALO, NEW YORK, ASSIGNOR TO NATIONAL ANILINE & CHEMICAL COMPANY, INC., OF NEW YORK, N. Y., A CORPORATION OF NEW YORK.

PRODUCTION OF META-HYDROXYBENZALDEHYDE.

1,419,695.　　　　Specification of Letters Patent.　Patented June 13, 1922.

No Drawing.　　Application filed January 6, 1921. Serial No. 435,544.

*To all whom it may concern:*

Be it known that I, JOHN B. SLIMM, residing at Buffalo, in the county of Erie, State of New York, have invented certain new and useful Improvements in the Production of Meta-Hydroxybenzaldehyde; and I do hereby declare the following to be a full, clear, and exact description of the invention, such as will enable others skilled in the art to which it appertains to make and use the same.

This invention relates to an improved process of making meta-hydroxybenzaldehyde from meta-nitrobenzaldehyde or from the sodium bisulfite addition compound of meta-aminobenzaldehyde (obtainable by converting meta-nitrobenzaldehyde into the sodium bisulfite addition compound, and reducing this compound).

It has heretofore been proposed to produce meta-hydroxybenzaldehyde from isolated meta-aminobenzaldehyde by subjecting the isolated meta-aminobenzaldehyde to diazotization and subsequent hydrolysis of the diazonium compound. It has also been proposed to produce meta-aminobenzaldehyde from meta-nitrobenzaldehyde by converting the meta-nitrobenzaldehyde into the bisulfite addition compound, reducing this compound to the corresponding compound of meta-aminobenzaldehyde, decomposing the resulting bisulfite compound, and separating and isolating the meta-aminobenzaldehyde.

According to the present invention, the production and isolation of meta-aminobenzaldehyde, and the treatment of the isolated meta-aminobenzaldehyde, are avoided, and the meta-hydroxybenzaldehyde is produced directly from the bisulfite addition compound of meta-aminobenzaldehyde, or indirectly from meta-nitrobenzaldehyde through the bisulfite compound, without isolation of the meta-aminobenzaldehyde. The meta-hydroxybenzaldehyde can thus be produced from meta-nitrobenzaldehyde without separation or isolation of intermediate products. The present invention therefore involves an improvement over prior processes, above referred to, in apparatus requirements and in the time and number of operations required; while the process is more easily controlled and gives more uniform results from run to run, as well as a somewhat increased yield of meta-hydroxybenzaldehyde and a product of improved quality.

We have discovered that meta-hydroxybenzaldehyde can be produced from the solution of the sodium bisulfite addition compound of meta-aminobenzaldehyde (resulting from the reduction of the sodium bisulfite addition compound of meta-nitrobenzaldehyde) by acidifying the solution and diazotizing directly (without first boiling the solution with acid to remove sulfur dioxide) and by subsequently adding the diazotized solution to boiling dilute mineral acid in order simultaneously to remove nitrogen from the diazonium compound and remove sulfur dioxide. The resulting meta-hydroxybenzaldehyde can then be obtained from the solution by cooling and adding salt whereby the meta-hydroxybenzaldehyde is precipitated in a crystalline state. The process of the present invention therefore eliminates, with corresponding decrease in apparatus requirement and time of operation, the boiling of the solution of the meta-animobenzaldehyde bisulfite addition compound and the subsequent cooling and filtration which have been heretofore practiced. The losses due to side reactions, which take place in the decomposition of the sodium bisulfite addition compound of meta-aminobenzaldehyde by heating prior to the diazotization, are eliminated, with resulting increase in yield of the meta-hydroxybenzaldehyde.

The invention will be further illustrated by the following specific example, the parts being by weight:

Production of the bisulfite addition compound of meta-aminobenzaldehyde: 120 pounds of meta-nitrobenzaldehyde, 100 pounds of sodium bisulfite and 200 pounds of water are agitated with little heating in a water jacketed, steel, cone-bottomed mixing tank until a complete solution is effected. 90 pounds of iron dust and 6 pounds of hydrochloric acid (20° Bé.) are mixed thoroughly with a little water and added to 125 pounds of water in a suitable tank and agitated therein for about 15 minutes with slight heating. Water is added to the iron and acid to make the charge up to about 800 pounds and the mixture is heated to about 45° C. The clear solution of the bisulfite compound of meta-nitrobenzaldehyde is then run in, and more water is added if necessary to bring the charge up to about 1550 pounds. The mixture is then heated very slowly to about 60° C., a mixture of 31 pounds of iron dust and 3 pounds of hydrochloric acid then added, and the mixture heated gradually to about 76° C., this last heating usually being effected by the heat of reaction. The charge is kept at about 80° C. for about one and one-quarter hours. A mixture of 31 pounds of iron dust and 2½ pounds of hydrochloric acid is then added and the charge heated gradually to about 86° C. and kept there for about one hour. The mixture is then made neutral or very slightly alkaline with caustic soda, heated to about 85–90° C. and filtered through a filter press.

The procedure above described converts the meta-nitrobenzaldehyde into its sodium bisulfite addition compound, and reduces the latter to the bisulfite compound of meta-aminobenzaldehyde, which is obtained in solution.

Production of meta-hydroxybenzaldehyde from solution of meta-aminobenzaldehyde-bisulfite addition compound: 1500 pounds of solution, obtained, for example, as above described, and containing about 56 pounds of meta-aminobenzaldehyde as the sodium bisulfite addition compound, are cooled to 0° C. in a suitable container, such as a wooden vat, and the solution agitated. Then 170 pounds of sulfuric acid of 50° Bé. are added, and 40 pounds of sodium nitrite are then introduced at such a rate that the heat of reaction does not bring the temperature of the solution above 4° C. After all the sodium nitrite is added, the agitation is maintained for a period of from 1 to 2 hours during which time the temperature is kept below 4° C. The resulting diazotized solution is then run slowly into a container which is fitted with an agitator and contains a mixture of 150 pounds of water and 50 pounds of sulfuric acid of 50° Bé. maintained at a temperature of about 100° C. by suitable heating means, such as lead steam coils. As a result of the addition of the diazonium compound to the hot acid, the diazonium compound is decomposed and meta-hydroxybenzaldehyde produced. The resulting solution is filtered and the filtrate collected in a cooling apparatus such as a brine jacketed kettle; 100 pounds of common salt are added, and, upon cooling, the meta-hydroxybenzaldehyde crystallizes out and is separated from the mother liquor by filtration.

The addition of the solution of the diazonium compound to the boiling dilute acid liquor decomposes the diazonium compound and removes nitrogen therefrom, and simultaneously removes sulfur dioxide. It may be that the addition of acid to the solution of the meta-aminobenzaldehyde-bisulfite compound for the diazotization may decompose more or less of this compound into sulfurous acid and a salt of meta-aminobenzaldehyde. However this may be, any undecomposed bisulfite compound will be decomposed, and the sulfur dioxide set free, when the solution of the diazonium compound is added to the hot acid liquor.

The specific procedure above described can be somewhat modified and varied. The sulfuric acid used in the diazotization may thus be replaced by an equivalent amount of hydrochloric acid. So also, the sulfuric acid solution used in decomposing the diazonium compound and removing the sulfur dioxide may be replaced by its equivalent of hydrochloric acid solution, or by solutions of common inorganic salts such as sodium chloride, or even by water alone; but the decomposition proceeds more rapidly if some electrolyte is added, and particularly if an acid such as sulfuric acid is used. For example, instead of using 50 pounds of sulfuric acid, an equal amount of hydrochloric acid may be used; or 25 to 35 pounds of salt may be used; or a mixture of 50 pounds of hydrochloric acid and 25 pounds of salt.

The meta-hydroxybenzaldehyde produced as above described can be further purified by dissolving in dilute caustic alkali solution, filtering, and neutralizing with hydrochloric acid. The meta-hydroxybenzaldehyde is thus reprecipitated and can then be filtered off and dried.

We claim:

1. The method of producing meta-hydroxybenzaldehyde, which comprises subjecting a solution of meta-aminobenzaldehyde-bisulfite addition compound to diazotization, and simultaneously removing nitrogen and sulfur dioxide by heating the resulting solution of diazonium compound.

2. The method of producing meta-hydroxybenzaldehyde, which comprises subjecting a solution of the sodium bisulfite addition compound of meta-aminobenzaldehyde to diazotization with acid and sodium nitrite and adding the resulting solution of diazonium compound to a heated dilute mineral acid, whereby the diazonium compound is decomposed and nitrogen and sulfur dioxide removed.

3. The process of producing meta-hydroxybenzaldehyde, which comprises subjecting a solution of meta-aminobenzaldehyde-bisulfite addition compound to diazotization with acid and sodium nitrite, and simultaneously removing nitrogen and sulfur dioxide by introducing the solution into a dilute solution of mineral acid kept at a temperature of about 100° C.

4. The method of producing meta-hydroxybenzaldehyde, which comprises subjecting a solution of the sodium bisulfite addition compound of meta-aminobenzaldehyde to diazotization with dilute sulfuric acid and sodium nitrite at a temperature of about zero to 4° C. and adding the diazotized solution to dilute sulfuric acid maintained at a temperature of about 100° C.

5. The method of producing meta-hydroxybenzaldehyde, which comprises subjecting a solution of the sodium bisulfite addition compound of meta-aminobenzaldehyde to diazotization at a temperature of about zero to 4° C., adding the diazotized solution to dilute sulfuric acid maintained at a temperature of about 100° C., and subsequently adding salt and cooling the solution whereby the meta-hydroxybenzaldehyde is separated in a crystalline state.

In testimony whereof I affix my signature.

JOHN B. SLIMM.